US011971647B2

(12) United States Patent
Itadani

(10) Patent No.: US 11,971,647 B2
(45) Date of Patent: Apr. 30, 2024

(54) OPENING AND CLOSING STRUCTURE FOR INSERTION PORT IN ELECTRONIC APPARATUS AND ELECTRONIC APPARATUS INCLUDING THE STRUCTURE

(71) Applicant: Panasonic Intellectual Property Management Co., Ltd., Osaka (JP)

(72) Inventor: Yutaro Itadani, Osaka (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 179 days.

(21) Appl. No.: 17/866,667

(22) Filed: Jul. 18, 2022

(65) Prior Publication Data
US 2023/0062327 A1 Mar. 2, 2023

(30) Foreign Application Priority Data
Aug. 26, 2021 (JP) .................................. 2021-138235

(51) Int. Cl.
*G03B 17/02* (2021.01)
*G06F 1/16* (2006.01)

(52) U.S. Cl.
CPC .......... *G03B 17/02* (2013.01); *G06F 1/1683* (2013.01); *G03B 2217/002* (2013.01)

(58) Field of Classification Search
CPC .................................................... G03B 17/02
See application file for complete search history.

(56) References Cited

U.S. PATENT DOCUMENTS

2021/0196085 A1\* 7/2021 Placencia .............. E05D 7/1072

FOREIGN PATENT DOCUMENTS

| CN | 213567493 U | \* | 6/2021 |
| JP | H02-108375 U | | 8/1990 |
| JP | H08-210015 A | | 8/1996 |
| JP | H11-159236 A | | 6/1999 |
| JP | 2014-140254 A | | 7/2014 |
| JP | 2016-109727 A | | 6/2016 |
| JP | 2020-188492 A | | 11/2020 |

\* cited by examiner

*Primary Examiner* — Leon W Rhodes, Jr.
(74) *Attorney, Agent, or Firm* — Renner, Otto, Boisselle & Sklar, LLP

(57) ABSTRACT

To provide an opening and closing structure for an insertion port in an electronic apparatus and an electronic apparatus that allow a user to easily recognize high quality. An opening and closing structure for an insertion port in an electronic apparatus includes: an opening and closing lid that opens and closes an insertion port; a shaft member that functions as a rotation axis of the opening and closing lid; a support member that rotatably supports the shaft member; and a biasing member that biases the opening and closing lid in an opening direction, in which the shaft member is press-fitted into the opening and closing lid with a first press-fitting margin, and is press-fitted into the support member with a second press-fitting margin different from the first press-fitting margin.

8 Claims, 14 Drawing Sheets

OPENING AND CLOSING STRUCTURE FOR INSERTION PORT IN ELECTRONIC APPARATUS AND ELECTRONIC APPARATUS INCLUDING THE STRUCTURE

BACKGROUND OF THE INVENTION

Field of the Invention

The present disclosure relates to an opening and closing structure for an insertion port in an electronic apparatus and an electronic apparatus including the structure.

Description of the Related Art

Japanese Patent Laid-Open Publication No. 2014-140254 discloses a digital camera including an opening and closing lid for opening and closing an insertion port for a memory card.

SUMMARY OF THE INVENTION

However, in a case where a biasing means, such as a spring, that biases the opening and closing lid in an opening direction is provided, the opening and closing lid may be opened so furiously that a large bounce or collision sound is caused, leading to a risk that a user may recognize poor quality.

The present disclosure provides an opening and closing structure for an insertion port in an electronic apparatus and an electronic apparatus including the structure, in which the opening and closing structure alleviates an impact when an opening and closing lid is opened, thereby leading a user to recognize high quality.

An opening and closing structure for an insertion port in an electronic apparatus according to the present disclosure includes: an opening and closing lid that opens and closes an insertion port in an electronic apparatus; a shaft member that functions as a rotation axis of the opening and closing lid; a support member that rotatably supports the shaft member; and a biasing member that biases the opening and closing lid in an opening direction, in which the shaft member is press-fitted into the opening and closing lid with a first press-fitting margin, and is press-fitted into the support member with a second press-fitting margin different from the first press-fitting margin.

An electronic apparatus according to the present disclosure includes the opening and closing structure.

According to the present disclosure, an opening and closing structure for an insertion port in an electronic apparatus and the electronic apparatus can be provided in which they lead a user to recognize high quality.

DESCRIPTION OF THE PREFERRED EMBODIMENTS

Hereinafter, embodiments will be described in detail with appropriate reference to the drawings.

However, description that is more detailed than necessary may be omitted. For example, detailed descriptions of already well-known matters or repeated descriptions of substantially the same configurations may be omitted. This is to avoid the following description from becoming unnecessarily redundant and to facilitate understanding by those skilled in the art. Note that the inventor(s) provides (provide) the accompanying drawings and the following description in order for those skilled in the art to fully understand the present disclosure, and the drawings and description are not intended to limit the claimed subject matters.

In the following, terms indicating directions, such as "upper", "lower", "lateral", "front", and "rear", are used on the assumption of states in normal use, for convenience of description, but they do not mean to limit use states of an imaging apparatus of the present disclosure.

Embodiment

In an embodiment, a digital camera (imaging apparatus) will be described as an example of an electronic apparatus according to the present disclosure.

First, a configuration of an imaging apparatus 2 according to the embodiment will be described with reference to FIGS. 1A and 1B.

Figure 1A:
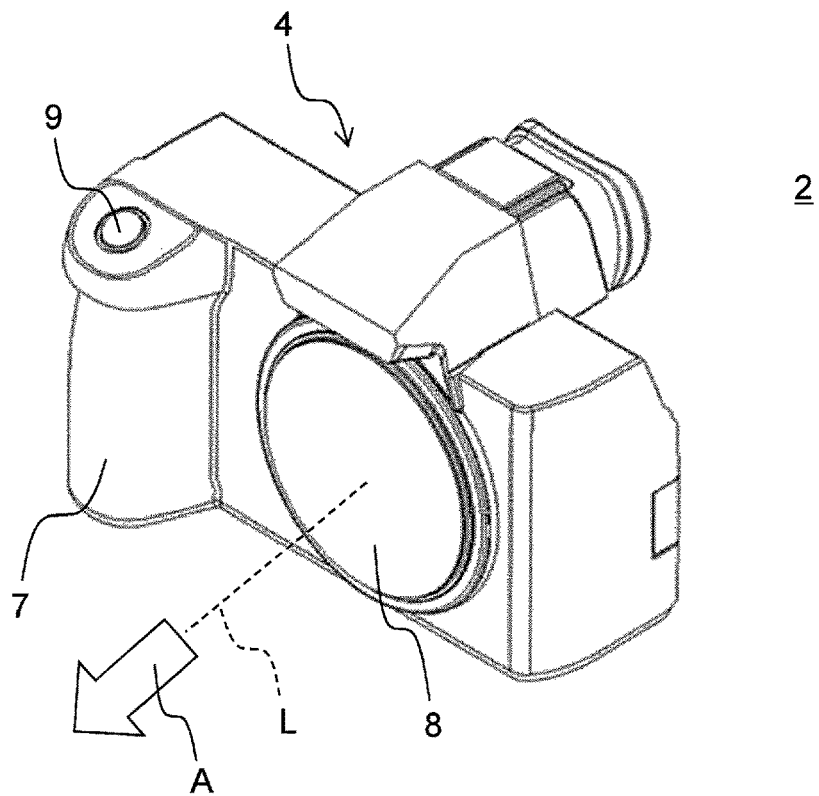
FIG. 1A is a schematic perspective view of a digital camera according to an embodiment of the present disclosure.
Figure 1B:
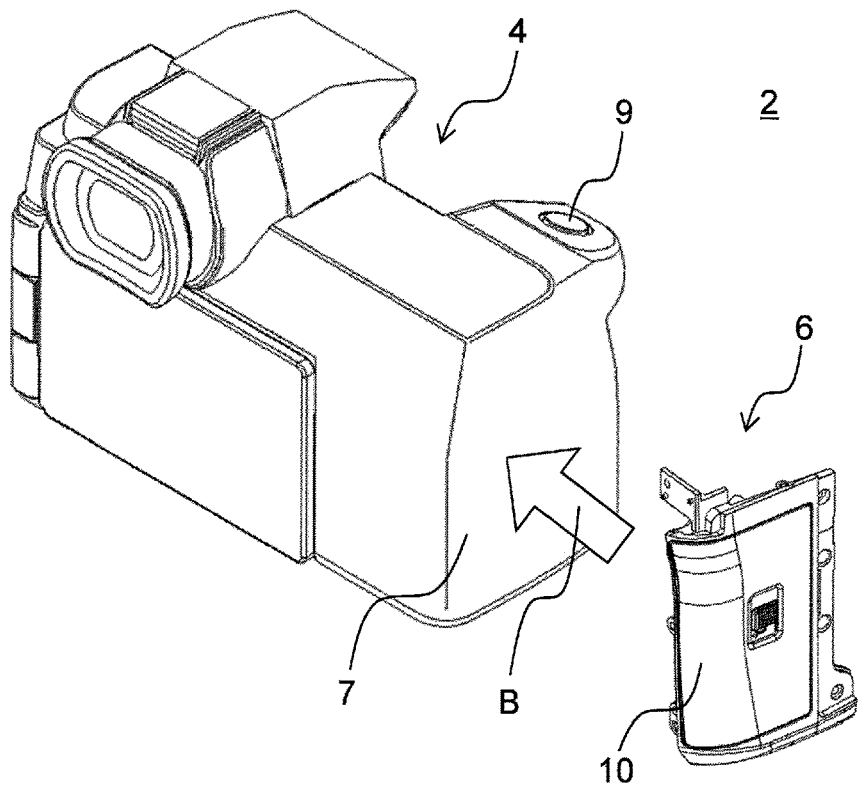
FIG. 1B is a schematic perspective view of the digital camera according to the embodiment.

FIGS. 1A and 1B are schematic perspective views of the imaging apparatus 2 according to the embodiment.

The imaging apparatus 2 illustrated in FIGS. 1A and 1B includes an imaging main body 4.

The imaging main body 4 is a portion for imaging a subject using a non-illustrated lens.

The imaging main body 4 incorporates various components such as an image sensor and an image engine. The imaging main body 4 is configured to image a subject (not illustrated) located on a front side along an optical axis L in an imaging direction A.

The imaging main body 4 includes a grip 7 and a lens cap 8.

The grip 7 is a portion for a user to grasp the imaging apparatus 2.

The grip 7 is provided on a lateral side of the imaging main body 4, and a release button 9 is provided on an upper surface of the grip 7. The lens cap 8 is a member that covers a lens attachment part (not illustrated) to which an interchangeable lens is to be attached. Various lenses can be attached to the lens attachment part.

As illustrated in FIG. 1B, an opening and closing structure 6 for an insertion port is attached to the same lateral side of the imaging main body 4 as the grip 7 (as illustrated by arrow B).

For the sake of explanation, FIG. 1B illustrates a state in which the opening and closing structure 6 is removed from the imaging main body 4.

The opening and closing structure 6 is a structure and mechanism that can open and close an insertion port 14 (shown in FIGS. 5A and 5B) to be described later.

A specific configuration of the opening and closing structure 6 will be described with reference to FIG. 2 and subsequent views.

FIGS. 2 to 4 and 5A to 5C are perspective views each illustrating the opening and closing structure 6.

Figure 2:
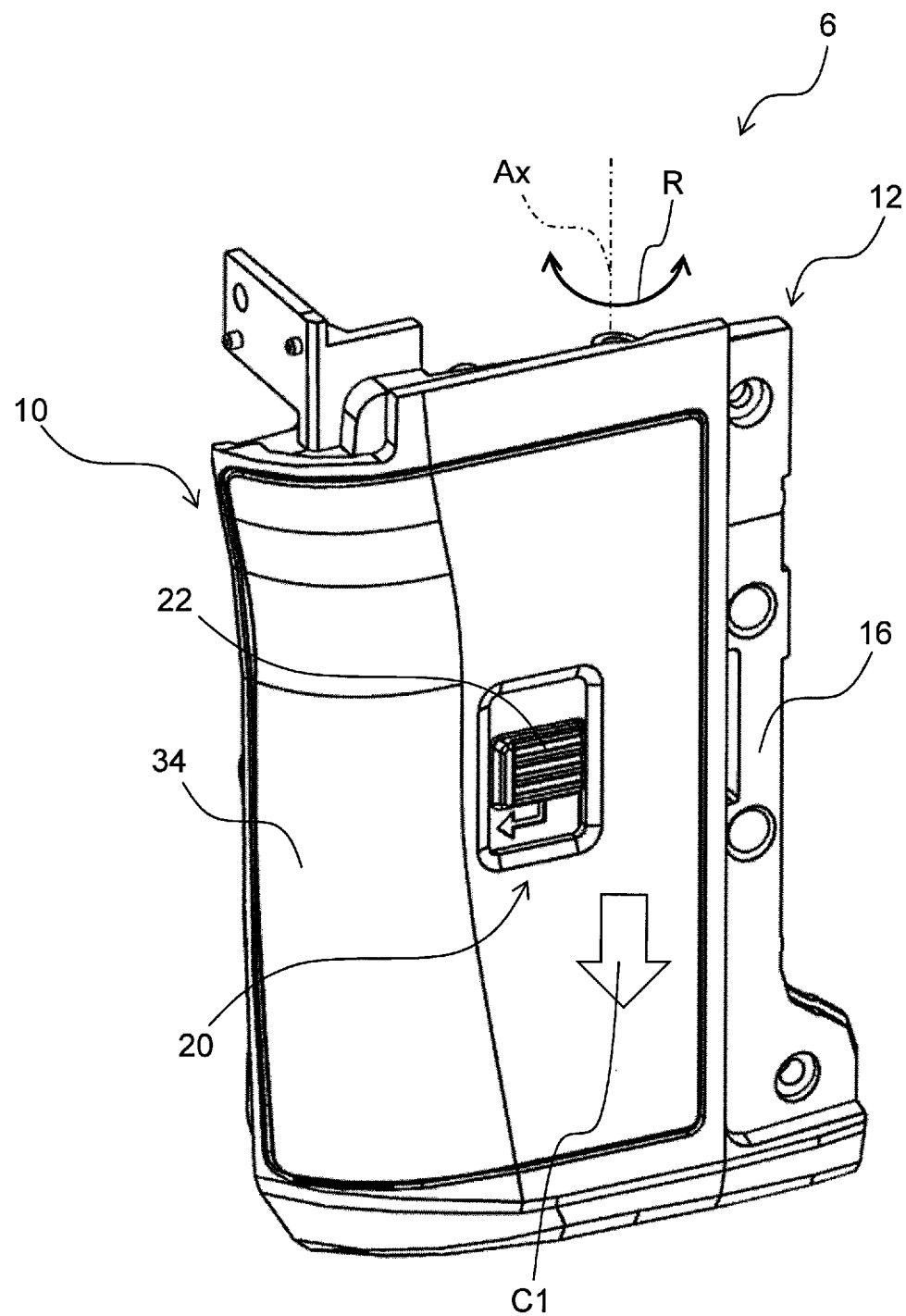
FIG. 2 is a perspective view of an opening and closing structure (closed state) according to the embodiment.
Figure 3:
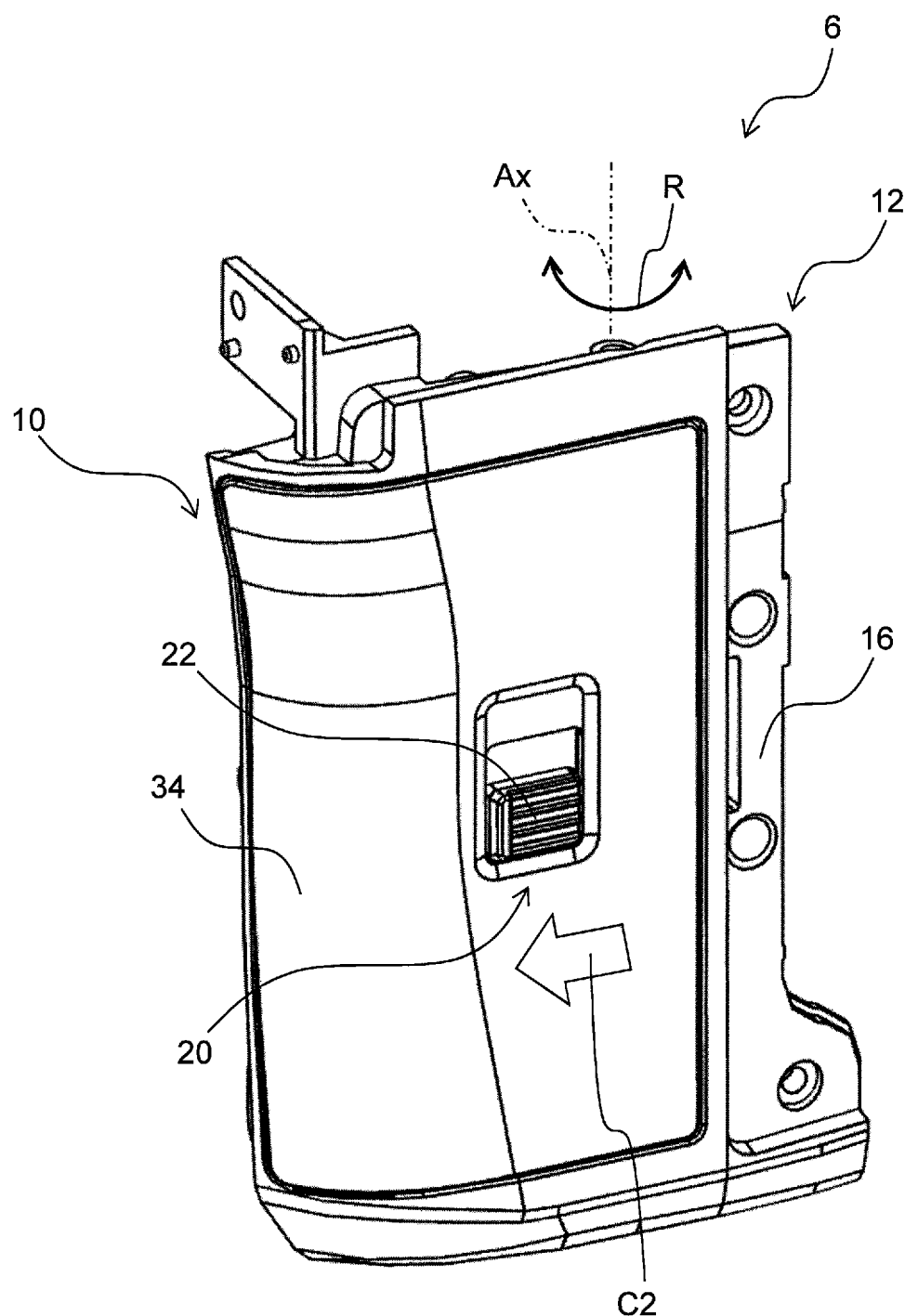
FIG. 3 is a perspective view of the opening and closing structure (closed state) according to the embodiment.
Figure 4:
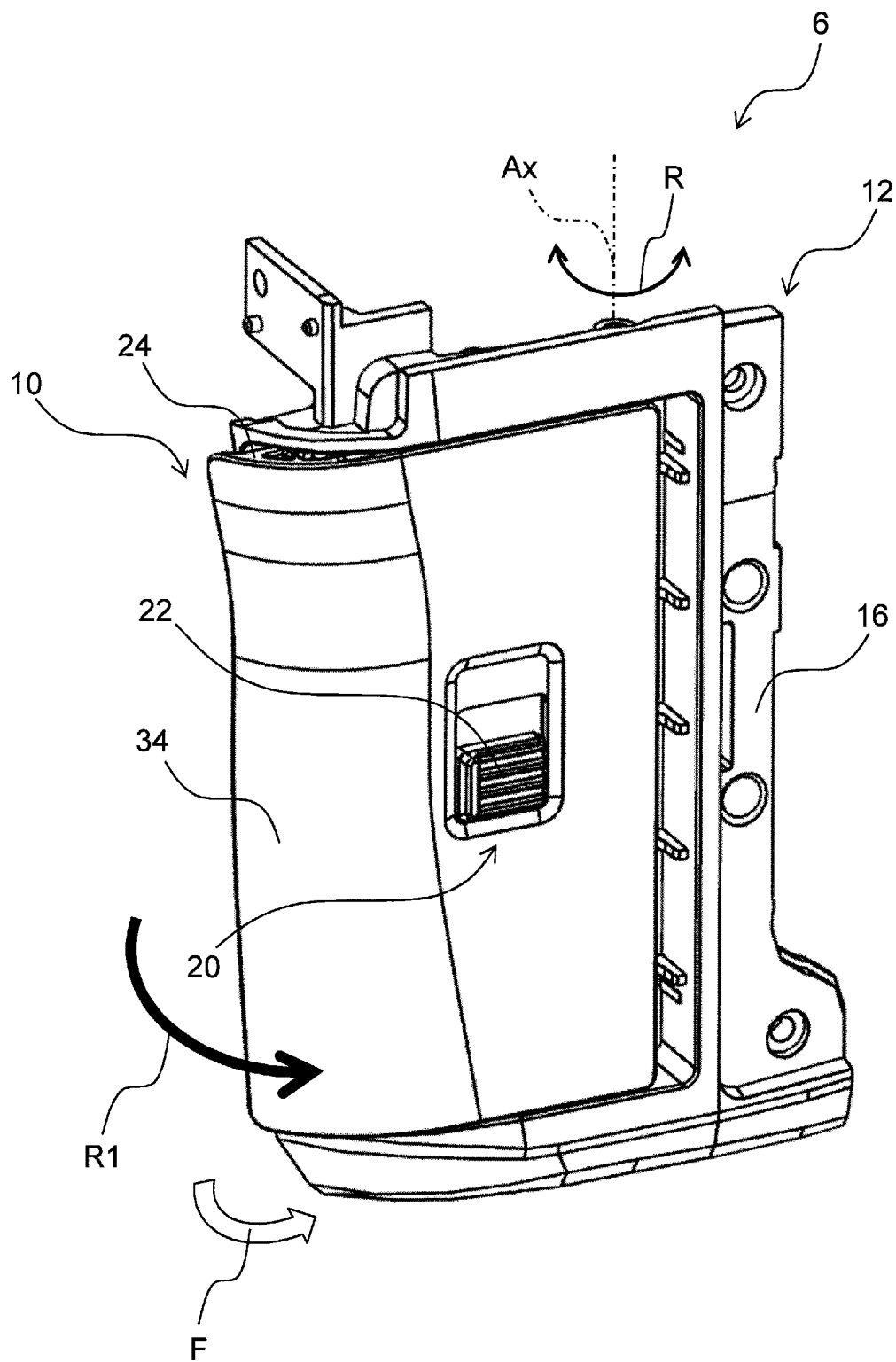
FIG. 4 is a perspective view of the opening and closing structure (closed state) according to the embodiment.
Figure 5A:
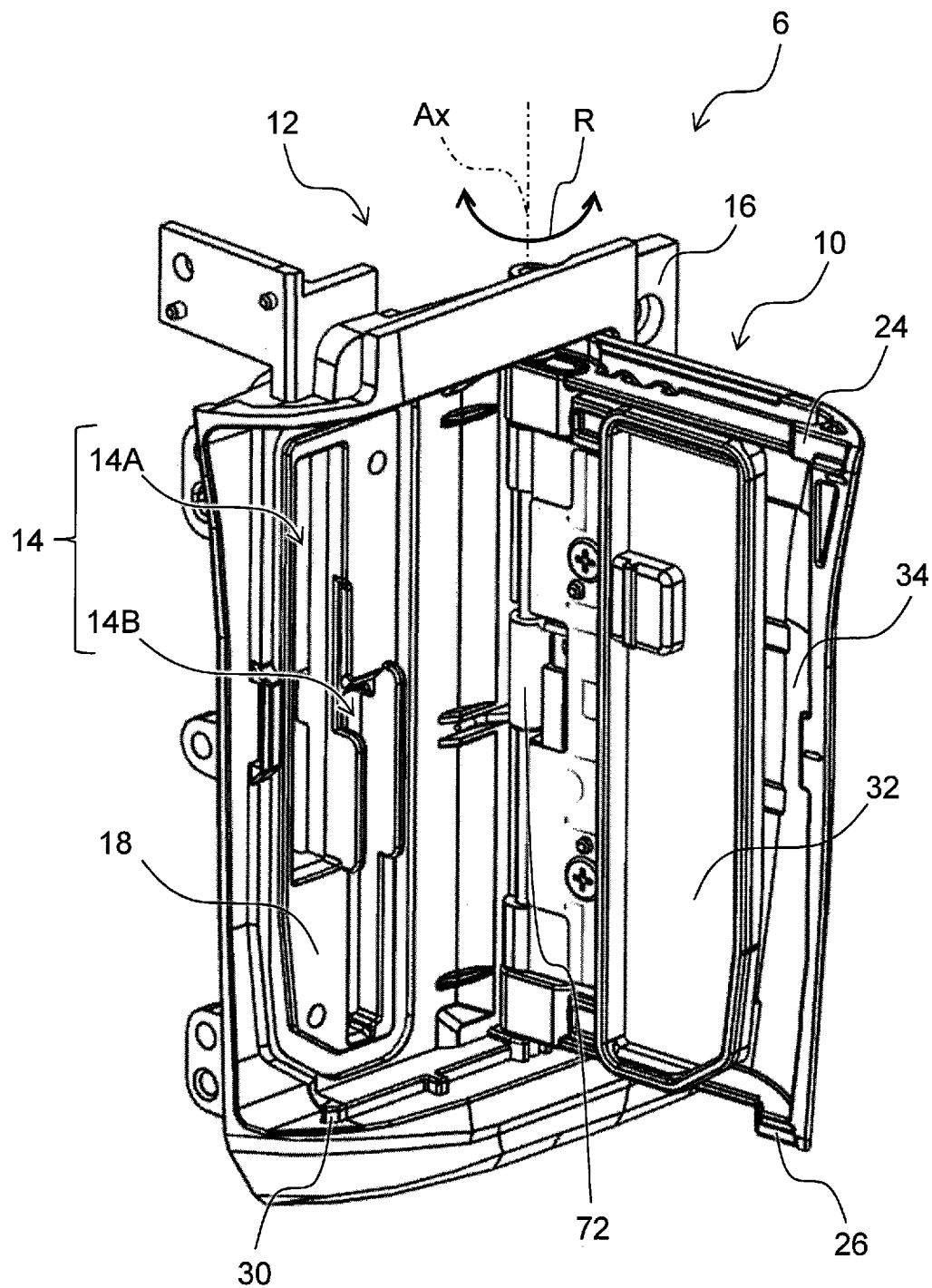
FIG. 5A is a perspective view of the opening and closing structure (opened state) according to the embodiment.
Figure 5B:
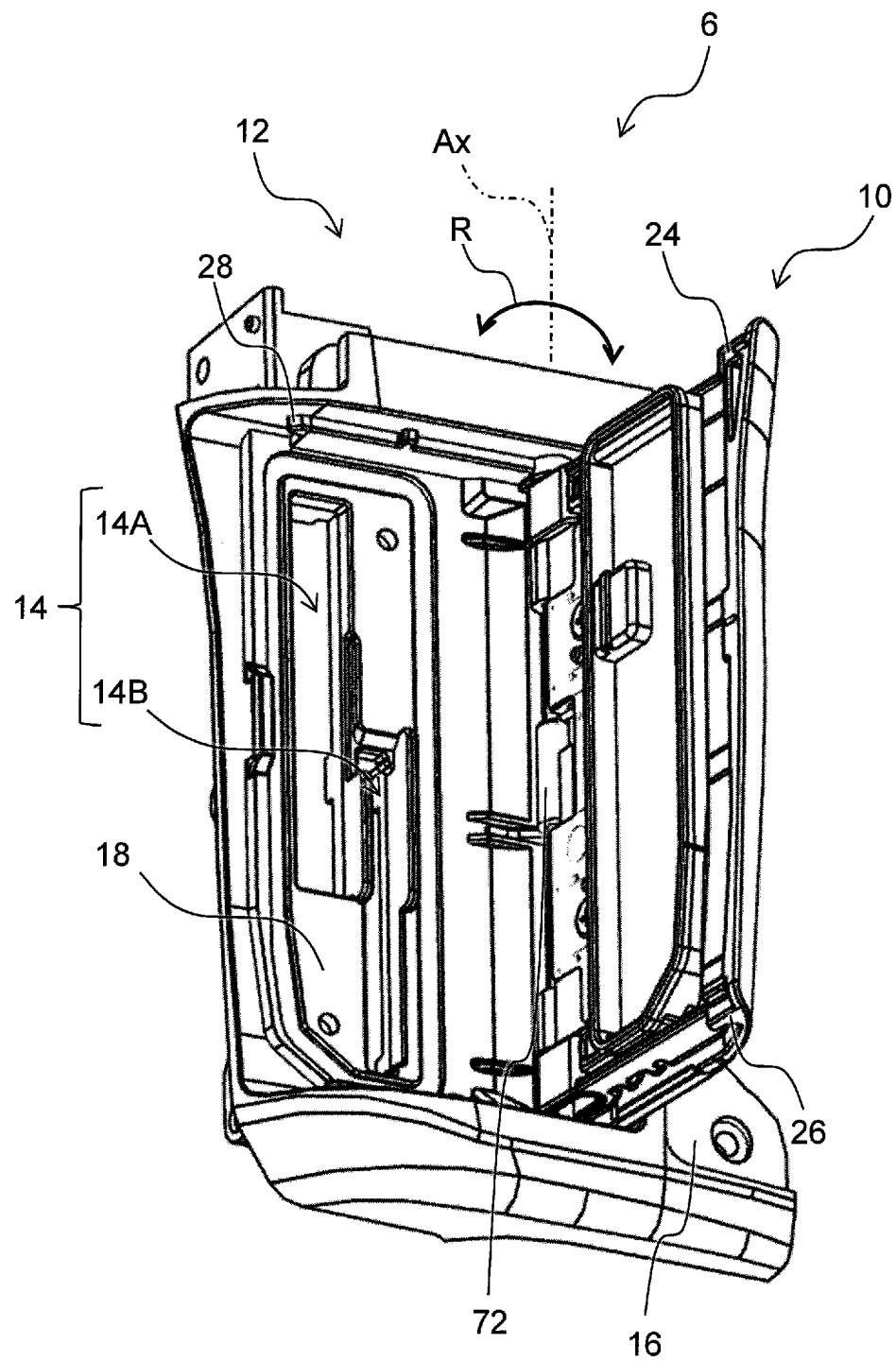
FIG. 5B is a perspective view of the opening and closing structure (opened state) according to the embodiment.
Figure 5C:
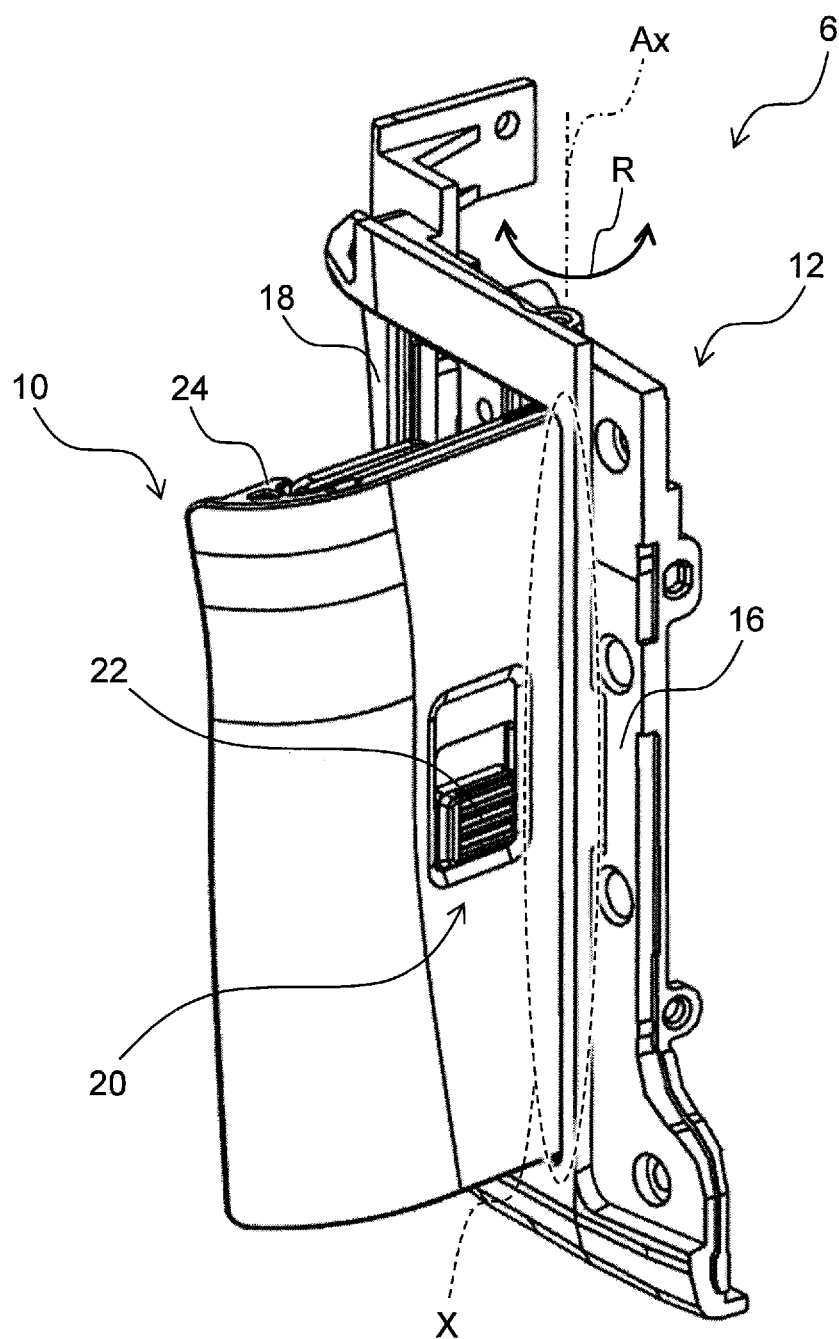
FIG. 5C is a perspective view of the opening and closing structure (opened state) according to the embodiment.

FIGS. 2 to 4 each illustrate a state in which an opening and closing lid 10 is closed. FIGS. 5A to 5C each illustrate a state in which the opening and closing lid 10 is opened.

As illustrated in FIGS. 2 to 4 and 5A to 5C, the opening and closing structure 6 includes the opening and closing lid 10 and a support member 12.

The opening and closing lid 10 is a lid member for opening and closing the insertion port 14 illustrated in FIGS. 5A, 5B, and others.

The opening and closing lid 10 is attached to the support member 12 in a state of being rotatable in a rotation direction R around a rotation axis Ax.

The support member 12 is a member that rotatably and pivotally supports the opening and closing lid 10.

The support member 12 has a shape that surrounds the opening and closing lid 10 inside, and includes a fixing portion 16 and an insertion-port forming portion 18 (FIGS. 5A to 5C).

The fixing portion 16 is a portion that is fixed to the imaging main body 4 illustrated in FIGS. 1A and 1B with screws or the like.

The insertion-port forming portion 18 is a portion where the insertion port 14 illustrated in FIGS. 5A and 5B is formed. The insertion-port forming portion 18 is provided at a position recessed with respect to the fixing portion 16 to constitute, together with the fixing portion 16, a recess that houses the opening and closing lid 10.

The insertion port 14 is an opening into which a non-illustrated recording medium, such as an SD card, is to be inserted.

The recording medium inserted into the insertion port 14 is electrically connected to a controller (not illustrated) included in the imaging main body 4. The insertion port 14 of the present embodiment has two insertion ports 14A and 14B, but the number of the insertion port 14 may be any number.

Returning to FIGS. 2 to 4, an opening 20 is formed in the opening and closing lid 10, and an operation claw 22 is exposed in the opening 20.

The operation claw 22 is a member for switching between a locked state (shown in FIGS. 2 and 3) and an unlocked state (shown in FIG. 4) of the opening and closing lid 10. In the locked state, the opening and closing lid 10 is restricted from rotating around the rotation axis Ax. In the unlocked state, the opening and closing lid 10 is allowed to rotate.

Operations of the operation claw 22 will be described below.

First, when the operation claw 22 is at the position illustrated in FIG. 2, the opening and closing lid 10 is in the locked state in which the operation claw 22 can be moved, by sliding, only in a downward direction indicated by an arrow C1.

When a user moves the operation claw 22 downward, the state illustrated in FIG. 3 is obtained, in which the operation claw 22 can be moved in a lateral direction indicated by an arrow C2.

When the user moves the operation claw 22 in the lateral direction, the operation claw 22 and the opening and closing lid 10 move integrally in the lateral direction. As a result, the state illustrated in FIG. 4 is obtained. In the state illustrated in FIG. 4, the opening and closing lid 10 is unlocked and the unlocked state is obtained, in which the opening and closing lid 10 can rotate in a rotation direction R1 around the rotation axis Ax.

The unlocked opening and closing lid 10 spontaneously rotates in the rotation direction R1 while being biased by a spring member 72 to be described later. The opening and closing lid 10 opens to a rotation position where the insertion port 14 is exposed as illustrated in FIGS. 5A to 5C.

As illustrated in FIG. 5C, a portion of a root, close to the rotation axis Ax, of the opening and closing lid 10 comes into contact with the support member 12 (shown as contact portion X). In the opening and closing structure 6 of the present embodiment, an ingenuity is exercised to alleviate an impact, at the contact portion X, to the opening and closing lid 10 (that is, press-fitting configuration of a shaft member 38). Details will be described later.

As illustrated in FIGS. 5A, 5B, and others, the opening and closing lid 10 has, in upper and lower portions, two hook parts 24 and 26.

The hook part 24 can be engaged with a protrusion 28 (shown in FIG. 5B) provided on the insertion-port forming portion 18. The hook part 26 can be engaged with a protrusion 30 (shown in FIG. 5A) provided on the insertion-port forming portion 18. When the hook parts 24 and 26 are respectively engaged with the protrusions 28 and 30, the opening and closing lid 10 is locked. When the engagements are released, the opening and closing lid 10 is unlocked.

Next, a detailed configuration of the opening and closing lid 10 will be described with reference to FIGS. 6 to 8.

Figure 6A:
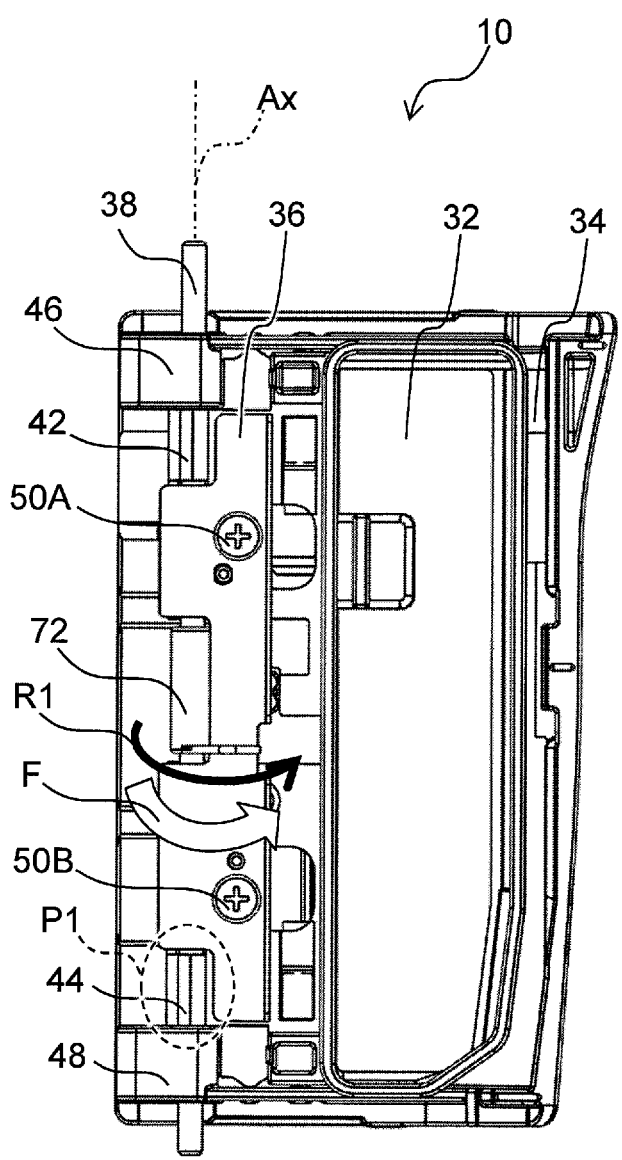
FIG. 6A is a front view of an opening and closing lid according to the embodiment (rocked state)
Figure 6B:
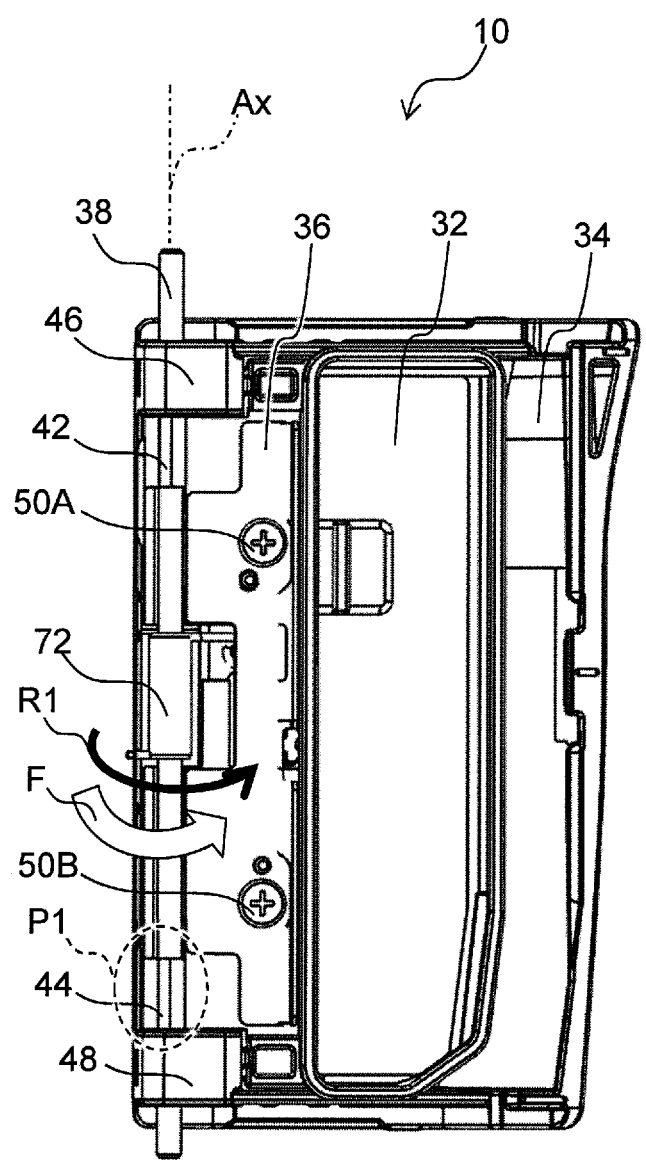
FIG. 6B is a front view of an opening and closing lid according to the embodiment (unrocked state)
Figure 7:
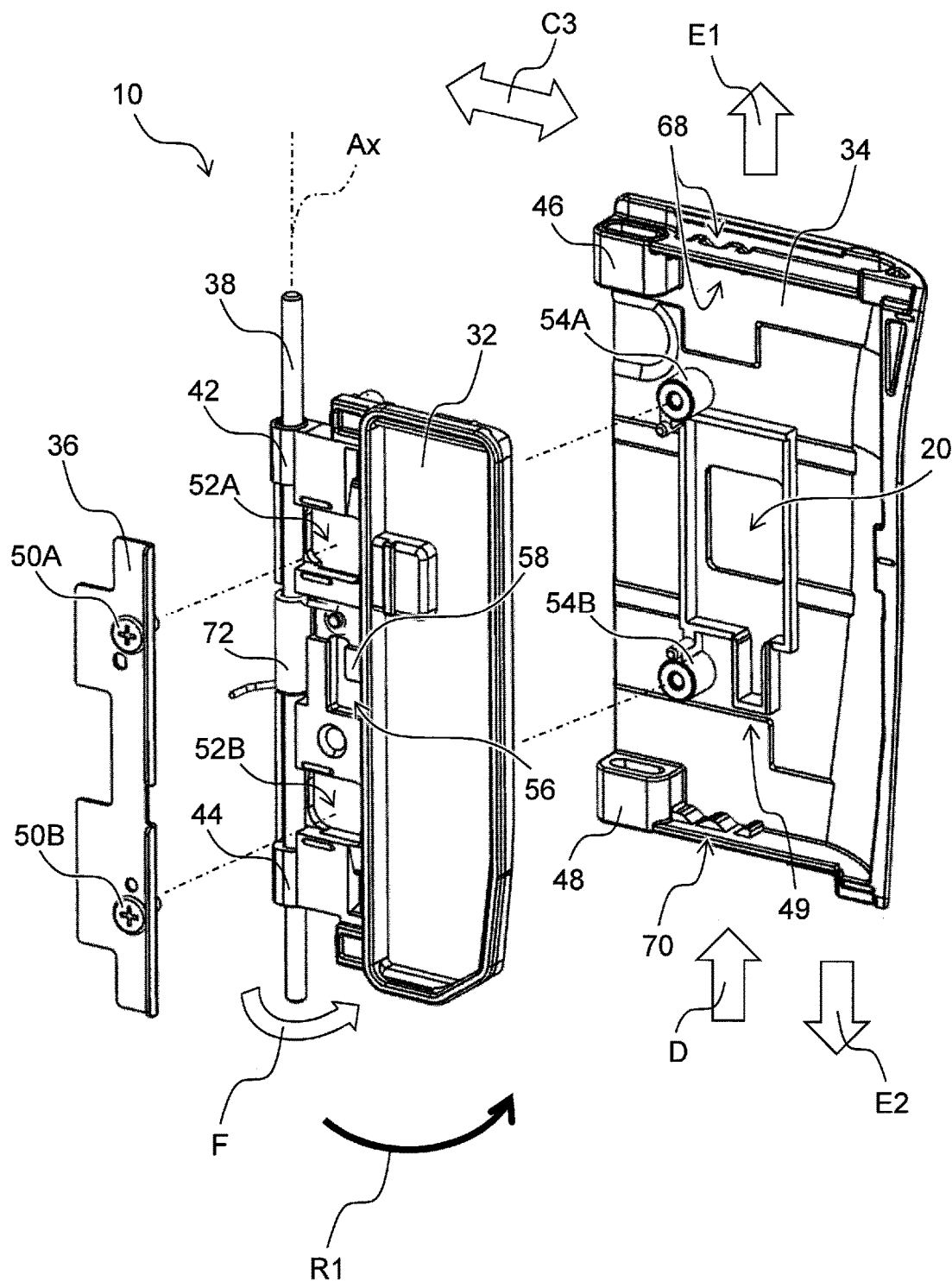
FIG. 7 is an exploded perspective view of the opening and closing lid according to the embodiment.
Figure 8:
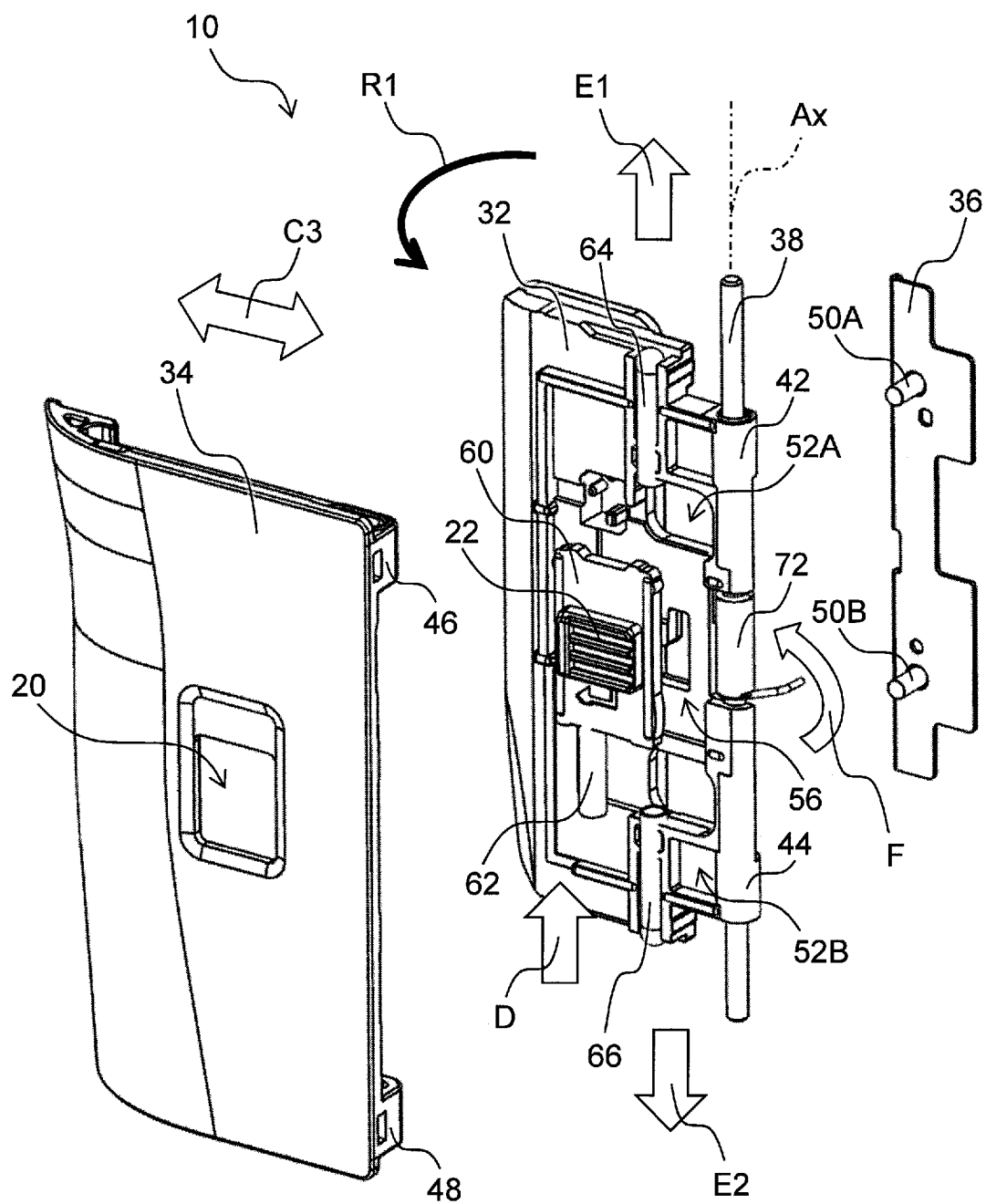
FIG. 8 is an exploded perspective view of the opening and closing lid according to the embodiment.

FIGS. 6A and 6B are front views of the opening and closing lid 10, and FIGS. 7 and 8 are exploded perspective views of the opening and closing lid 10.

As illustrated in FIGS. 6A to 8, the opening and closing lid 10 includes an inner lid 32, an outer lid 34, and a connecting member 36.

The inner lid 32 and the outer lid 34 are lid members provided to be integrally rotatable with each other.

The inner lid 32 is located inside, and the outer lid 34 is located outside. In the states illustrated in FIGS. 2 to 4, the outer lid 34 is exposed to the outside, while the inner lid 32 is not exposed to the outside.

The inner lid 32 and the outer lid 34 are each made of a resin.

Since the outer lid 34 is a member exposed to the outside, it is made of a resin having a higher strength than that of the inner lid 32. Similarly, the support member 12 is also a member exposed to the outside, so that it is made of a resin having a higher strength than that of the inner lid 32.

The shaft member 38 is inserted through both the inner lid 32 and the outer lid 34.

The shaft member 38 is a rod-shaped member that functions as the rotation axis Ax of the opening and closing lid 10.

The shaft member 38 is made of, for example, metal.

The inner lid 32 is provided with bearing parts 42 and 44 for receiving the shaft member 38.

The bearing parts 42 and 44 are tubular members each forming a space having a substantially circular cross section. In the present embodiment, the shaft member 38 is press-fitted into, of the two bearing parts 42 and 44, only the bearing part 44, and the shaft member 38 is inserted into the bearing part 42 in a non-press-fitted state. As illustrated in FIGS. 6A and 6B, the bearing part 44 constitutes a first press-fitting portion P1.

Similarly, the outer lid 34 is also provided with bearing parts 46 and 48 for receiving the shaft member 38.

The bearing parts 46 and 48 are tubular members each having a space having a substantially oval (that is, long hole) cross section. The shaft member 38 is inserted into each of the bearing parts 46 and 48 in a non-press-fitted state.

While the bearing parts 42 and 44 of the inner lid 32 each form a space having a circular cross section, the bearing parts 46 and 48 of the outer lid 34 each form a space having an oval cross section. As a result, the outer lid 34 can be moved, by sliding, in a lateral direction (shown as arrow C3) with respect to the inner lid 32 and the shaft member 38.

When the operation claw 22 and the outer lid 34 move, from the state illustrated in FIG. 3, in the lateral direction indicated by the arrow C2, the outer lid 34 slides, while the inner lid 32 and the shaft member 38 (that is, rotation axis Ax) are stopped without sliding.

FIGS. 6A and 6B each illustrate a different sliding position of the outer lid 34 with respect to the inner lid 32.

The position illustrated in FIG. 6A corresponds to the locked state illustrated in FIGS. 2 and 3, while FIG. 6B corresponds to the unlocked state illustrated in FIGS. 4 and 5A to 5C.

The connecting member 36 is a member that connects the inner lid 32 and the outer lid 34 to each other.

As illustrated in FIGS. 7 and 8, the connecting member 36 has screws 50A and 50B.

The screws 50A and 50B are inserted through gaps 52A and 52B formed by the inner lid 32 and are fixed to bosses 54A and 54B formed by the outer lid 34, respectively. Since the gaps 52A and 52B each have a length in the lateral direction, the outer lid 34 and the connecting member 36 can slide in the lateral direction with respect to the inner lid 32 while maintaining a state of not falling off the inner lid 32.

As illustrated in FIG. 8, the operation claw 22 fitted into the opening 20 of the outer lid 34 is also fitted into an opening 56 formed in the inner lid 32.

As illustrated in FIG. 7, a protrusion 58 is formed on the back side of the operation claw 22, the protrusion 58 being inserted into the opening 56. Since the opening 56 has an L-shape, a two-dimensional movement of the operation claw 22 as illustrated in FIGS. 2 to 4 can be made.

As illustrated in FIG. 8, a support plate 60 that supports the operation claw 22 is provided.

The support plate 60 supports, on the front side thereof, the operation claw 22, and supports, on the back side thereof, the protrusion 58.

As illustrated in FIG. 8, a bar-shaped spring member 62 is attached to the lower portion of the support plate 60.

The spring member 62 generates a biasing force D as a resistance force against the sliding movement of the operation claw 22. As illustrated in FIG. 7, the outer lid 34 is provided with a spring receiving part 49 for receiving the spring member 62. When the spring member 62 is compressed by the spring receiving part 49, an upward biasing force D is generated. The biasing force D acts as a resistance force against a movement of the operation claw 22 by a user as illustrated in FIGS. 2 to 4. A position (that is, lock position), where the operation claw 22 is located upward as illustrated in FIG. 2, is set to a default position.

As illustrated in FIG. 8, the inner lid 32 is provided with two spring members 64 and 66 separately from the spring member 62 described above.

Both the spring members 64 and 66 come into contact with recesses and protrusions 68 and 70 of the outer lid 34 illustrated in FIG. 7, respectively. When the spring member 64 comes into contact with the recesses and protrusions 68, an upward biasing force E1 is generated. When the spring member 66 comes into contact with the recesses and protrusions 70, a downward biasing force E2 is generated. When the outer lid 34 moves, by sliding, in the lateral direction (shown as arrow C3) with respect to the inner lid 32, the biasing forces E1 and E2 generate a click feeling according to the shapes of the recesses and protrusions 68 and 70.

As illustrated in FIGS. 6A to 8, a spring member 72 is further attached to the shaft member 38.

The spring member 72 is a biasing member for biasing the opening and closing lid 10 in an opening direction (shown as rotation direction R1). One end of the spring member 72 is fixed to the insertion-port forming portion 18 illustrated in FIG. 5A, and the other end is fixed to the inner lid 32.

The spring member 72 has a cylindrical shape through which the shaft member 38 is to be inserted.

An inner diameter of the spring member 72 is set to be larger than an outer diameter of the shaft member 38, so that the spring member 72 does not rotate with the rotation of the shaft member 38.

Since the spring member 72 always generates a biasing force F that biases the opening and closing lid 10 in the opening direction, the outer lid 34 spontaneously rotates in the rotation direction R1 when the operation claw 22 and the outer lid 34 reach an unlock position, as illustrated in FIG. 4.

When the opening and closing lid 10 spontaneously rotates, the opening and closing lid 10 comes into contact with the support member 12 at the contact portion X illustrated in FIG. 5C, as described above. If the rotation speed of the opening and closing lid 10 is fast, the opening and closing lid 10 furiously collides with the support member 12. As a result, a large bounce or collision sound is caused, leading to a risk that a user may recognize poor quality.

In response to this, in the opening and closing structure 6 and the imaging apparatus 2 of the present embodiment, the shaft member 38, functioning as the rotation axis Ax, is press-fitted into both the opening and closing lid 10 and the support member 12 to an extent in which the shaft member 38 can rotate, in order to alleviate the impact to the opening and closing lid 10 at the contact portion X.

As a result, the opening and closing lid 10 rotates while receiving a frictional force during its rotation, so that the rotation speed of the opening and closing lid 10 can be reduced, and the impact at the contact portion X can be alleviated.

Figure 9:
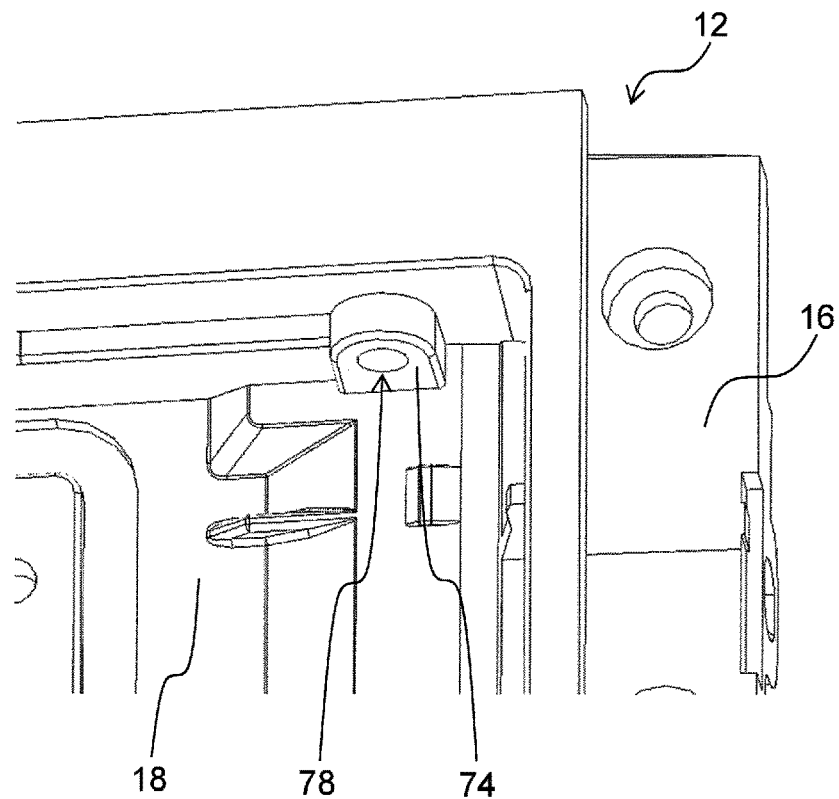
FIG. 9 is an enlarged perspective view illustrating a bearing part (upper side) of a support member according to the embodiment.
Figure 10:
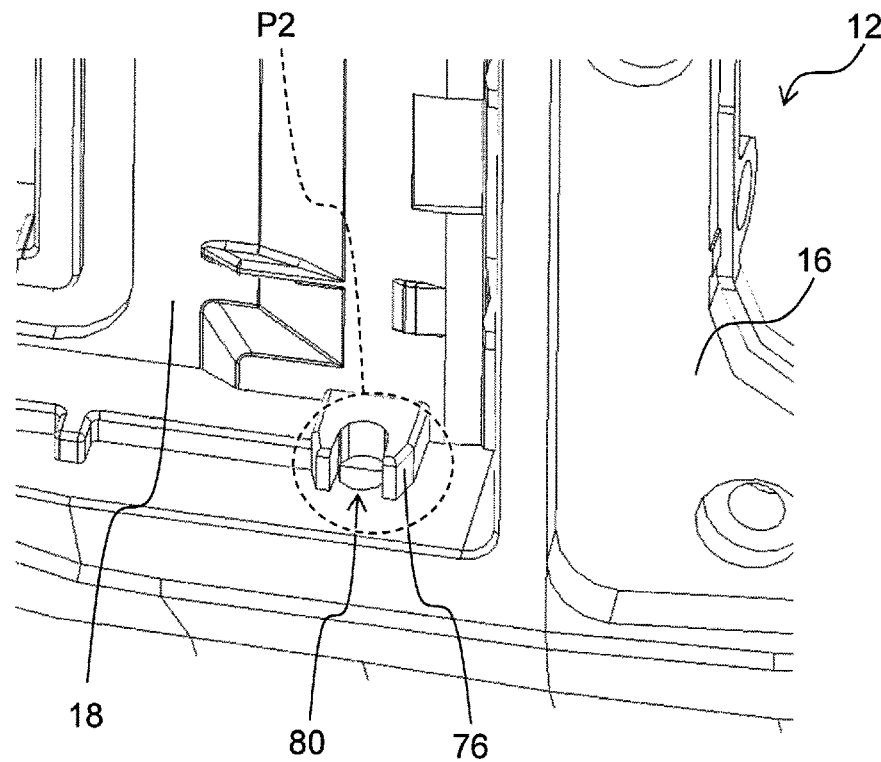
FIG. 10 is an enlarged perspective view illustrating a bearing part (lower side) of the support member according to the embodiment.

FIGS. 9 and 10 are perspective views respectively illustrating bearing parts 74 and 76 in the support member 12 that receive the shaft member 38 (not illustrated).

As illustrated in FIGS. 9 and 10, the support member 12 includes the bearing part 74 on the upper side and the bearing part 76 on the lower side as the two bearing parts 74 and 76 for receiving the shaft member 38.

The bearing parts 74 and 76 form insertion holes 78 and 80, respectively.

Each of the insertion holes 78 and 80 has a shape having a substantially circular cross section. An upper end of the shaft member 38 is inserted through the insertion hole 78 of the bearing part 74, while a lower end of the shaft member 38 is inserted through the insertion hole 80 of the bearing part 76. In the present embodiment, the shaft member 38 is press-fitted into, of the two bearing parts 74 and 76, only the bearing part 76, and the shaft member 38 is inserted into the bearing part 74 in a non-press-fitted state. As illustrated in FIG. 10, the bearing part 76 constitutes a second press-fitting portion P2.

To insert the shaft member 38 into the bearing parts 74 and 76, it is enough to firstly insert (non-press-fitting) the upper end of the shaft member 38 into the bearing part 74 on the upper side and then insert and press-fit the lower end of the shaft member 38 into the bearing part 76 on the lower side.

Before inserting the shaft member 38 into the bearing parts 74 and 76 of the support member 12, the shaft member 38 may be inserted into the bearing parts 42 and 44 of the opening and closing lid 10.

Figure 11:
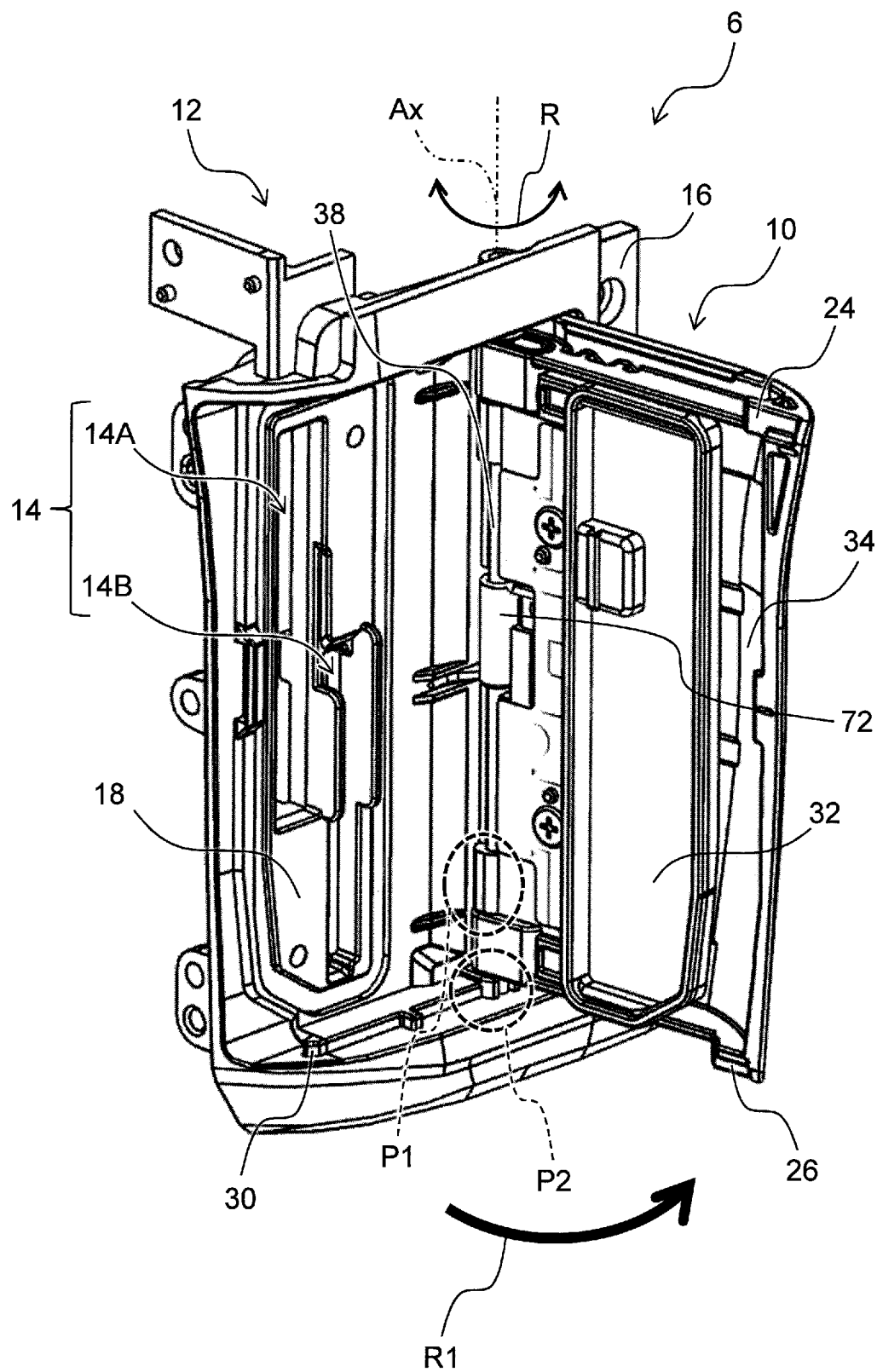
FIG. 11 is a perspective view for explaining a press-fitting action of a shaft member in the opening and closing structure according to the embodiment.

According to the configuration described above, the shaft member 38 is press-fitted into the opening and closing lid 10 at the first press-fitting portion P1 and press-fitted into the support member 12 at the second press-fitting portion P2, as illustrated in the perspective view of FIG. 11.

In the present embodiment, a press-fitting margin (first press-fitting margin) at the first press-fitting portion P1 and a press-fitting margin (second press-fitting margin) at the second press-fitting portion P2 are made different from each other. As a result, at the press-fitting portion with a small press-fitting margin of the two press-fitting portions P1 and P2, the shaft member 38 relatively rotates with receiving a dynamic friction force due to the contact with other member (that is, the opening and closing lid 10 or the support member 12). Also, at the press-fitting portion with a large press-fitting margin, the shaft member 38 rotates with other member (that is, the support member 12 or the opening and closing lid 10), or stands still.

With the shaft member 38 rotating while generating friction at either of the press-fitting portions P1 and P2, the rotation speed of the opening and closing lid 10 can be reduced as compared with a case where the shaft member 38 is press-fitted into only either the opening and closing lid 10 or the support member 12.

As a result, the impact to the opening and closing lid 10 at the contact portion X illustrated in FIG. 5C can be alleviated, so that bounce or impact sound can be suppressed, and a user of the imaging apparatus 2 easily recognizes high quality of the product.

In the present embodiment, the press-fitting margin at the first press-fitting portion P1 is set to be larger than the press-fitting margin at the second press-fitting portion 22.

That is, when the shaft member 38 is press-fitted, a degree of the press-fitting with respect to the opening and closing lid 10 is made larger (tighter) than a degree of the press-fitting with respect to the support member 12.

According to such a setting, when the opening and closing lid 10 rotates, the shaft member 38 rotates with the opening and closing lid 10 while rotating relative to the support member 12.

As compared with a case where only the opening and closing lid 10 rotates without the rotation of the shaft member 38, resistance to the rotation of the opening and closing lid 10 is more likely to occur, so that the rotation can be further reduced.

In the present embodiment, the support member 12 and the inner lid 32 are made of different types of resins.

As described above, a resin for the support member 12 has a higher strength than that of a resin for the inner lid 32, since the support member 12 is exposed to the outside while the inner lid 32 is not. The strength of the resin of the support member 12 on which the shaft member 38 relatively rotates is higher than the strength of the resin of the inner lid 32 on which the shaft member 38 rotates with, thereby reducing wear between the members caused by the rotation of the opening and closing lid 10.

Figure 12:
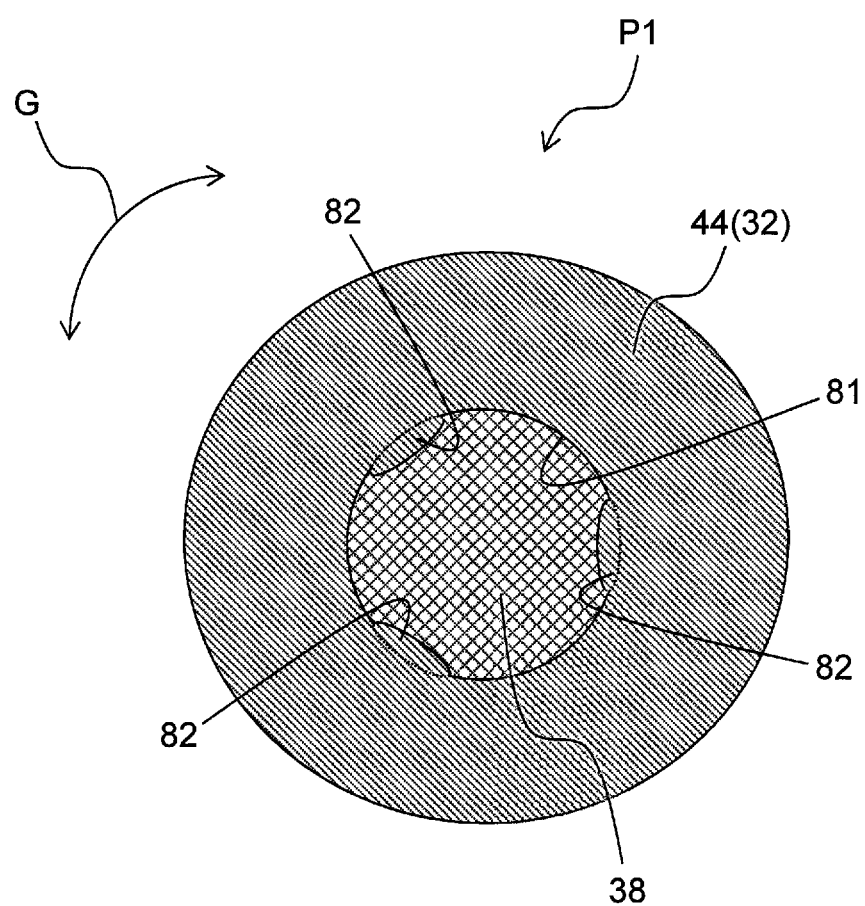
FIG. 12 is a cross-sectional view of a first press-fitting portion according to the embodiment.

In the present embodiment, the shape of the bearing part 44 of the inner lid 32 is designed as illustrated in FIG. 12, in order to make the press-fitting margin at the first press-fitting portion P1 larger than the press-fitting margin at the second press-fitting portion P2.

FIG. 12 is a schematic cross-sectional view illustrating the bearing part 44 of the inner lid 32 and the shaft member 38 constituting the first press-fitting portion P1.

As illustrated in FIG. 12, the bearing part 44 has an inner peripheral surface 81 that surrounds the shaft member 38 inside, and forms a plurality of ribs 82 on the inner peripheral surface 81.

Each of the ribs 82 is a protrusion protruding from the inner peripheral surface 81 toward a center, and the ribs 82 are arranged to be spaced from each other in a circumferential direction G.

In the present embodiment, three ribs 82 are provided. The ribs 82 separately provided at three locations can stably support the shaft member 38 having a circular cross section. The number of the ribs 82 may be at least one without being limited to three. Using at least one rib 82 can achieve easy forming of the first press-fitting portion P1 into which the shaft member 38 is to be press-fitted, and easy adjustment of the press-fitting margin.

Although the press-fitting structure at the first press-fitting portion P1 is illustrated in FIG. 12, rib may be similarly used in the press-fitting structure at the second press-fitting portion P2 (not illustrated).

In a case where the rib is used, magnitude relationship between the press-fitting margins at the first press-fitting portion P1 and second press-fitting portion P2 may be set by appropriately changing elements such as height of the rib, number of the ribs, length of the rib, and surface area of the rib. Not limited to the case using the ribs, the magnitude relationship between the press-fitting margins may be set by operating other elements.

For measuring the magnitude relationship between the press-fitting margins at the press-fitting portions P1 and P2, it may also be based on a behavior of the shaft member 38 when the opening and closing lid 10 rotates, not limited to the case of direct measuring.

Specifically, when the shaft member 38 rotates with the opening and closing lid 10, it may be determined that the press-fitting margin at the first press-fitting portion P1 is larger than the press-fitting margin at the second press-fitting portion P2. Otherwise, when the shaft member 38 does not rotate with the opening and closing lid 10 and only the opening and closing lid 10 rotates, it may be determined that the press-fitting margin at the second press-fitting portion P2 is larger than the press-fitting margin at the first press-fitting portion P1.

In addition, the "press-fitting margin" may be replaced by a term such as "tightening margin".

Similarly to the "press-fitting margin", other indices may be referred to, as long as they indicate degrees of press-fitting when the shaft member 38 is press-fitted into another member.

As described above, the opening and closing structure 6 of the embodiment includes: the opening and closing lid 10 that opens and closes the insertion port 14 in the imaging apparatus 2 (electronic apparatus); the shaft member 38 that functions as the rotation axis Ax of the opening and closing lid 10; the support member 12 that rotatably supports the shaft member 38; and the spring member 72 that biases the opening and closing lid 10 in the opening direction, in which the shaft member 38 is press-fitted into the opening and closing lid 10 with a first press-fitting margin, and is press-fitted into the support member 12 with a second press-fitting margin different from the first press-fitting margin.

According to such a configuration, the opening and closing lid 10 rotates with receiving a frictional force by press-fitting the shaft member 38 into both the opening and closing lid 10 and the support member 12, so that a brake can be applied to the rotation of the opening and closing lid 10. Therefore, an impact, possibly occurring when the opening and closing lid 10 furiously rotates and collides with another member such as the support member 12, can be suppressed, so that it is easy to make a user recognize high quality of the electronic apparatus.

According to the opening and closing structure 6 of the embodiment, the first press-fitting margin is larger than the second press-fitting margin.

According to such a configuration, the shaft member 38 can rotate with the opening and closing lid 10 while relatively rotating with respect to the support member 12 during the rotation of the opening and closing lid 10. As compared with the case where only the opening and closing lid 10 rotates without accompanying the rotation of the shaft member 38, resistance to the rotation of the opening and closing lid 10 is more likely to occur, so that the rotation speed can be further reduced.

In addition, according to the opening and closing structure 6 of the embodiment, the bearing parts 74 and 76 (that is, first bearing parts) where the support member 12 receives the shaft member 38 and the bearing parts 42 and 44 (that is, second bearing parts) where the opening and closing lid 10 receives the shaft member 38 are both made of resins. The resin for the bearing parts 74 and 76 of the support member 12 has a higher hardness than a hardness of the resin for the bearing parts 42 and 44 of the opening and closing lid 10.

According to such a configuration, the shaft member 38 rotates while generating, during rotation of the opening and closing lid 10, friction with the bearing parts 74 and 76 each having a higher strength, so that wear between the members can be suppressed.

In addition, according to the opening and closing structure 6 of the embodiment, the opening and closing lid 10 includes the inner lid 32 and the outer lid 34 that are rotatable integrally with the shaft member 38. The shaft member 38 is press-fitted into the inner lid 32 and is inserted into the outer lid 34 in a non-press-fitted state.

According to such a configuration, design flexibility can be improved, such as realizing a lock mechanism of the opening and closing lid 10 by providing a sliding function to the outer lid 34.

In addition, according to the opening and closing structure 6 of the embodiment, the outer lid 34 is slidable with respect to the inner lid 32 between a lock position where the rotation of the opening and closing lid 10 is restricted and an unlock position where the restriction is released.

According to such a configuration, a lock function of the opening and closing lid 10 can be realized.

In addition, according to the opening and closing structure 6 of the embodiment, the bearing part 44 where the opening and closing lid 10 receives the shaft member 38 has at least one rib 82.

According to such a configuration, using the at least one rib 82 can achieve easy forming of the first press-fitting portion P1, into which the shaft member 38 is to be press-fitted, and easy adjustment of a press-fitting margin.

In addition, according to the opening and closing structure 6 of the embodiment, three ribs 82 are provided to be spaced apart from each other in the circumferential direction G of the shaft member 38.

According to such a configuration, the press-fitted shaft member 38 can be stably supported by receiving the shaft member 38 with the three ribs 82. In addition, it is more resistant to wear than a case where there is only one rib 82, so that it is suitable for long-term use. Furthermore, as compared with a case where there are four or more ribs 82, the press-fitting margin is less likely to be excessively large, and ease of assembly can be ensured.

In addition, according to the opening and closing structure 6 of the embodiment, the bearing parts 42 and 44, where the opening and closing lid 10 receives the shaft member 38, are provided separately at two locations spaced apart from each other in an axial direction of the shaft member 38. Into the bearing part 44 on one side, the shaft member 38 is press-fitted, while through the bearing part 42 on the other side, the shaft member 38 is inserted in a non-press-fitted state.

According to such a configuration, the opening and closing structure 6 can be easily assembled by inserting the shaft member 38 into the bearing part 42 and then press-fitting the shaft member 38 into the bearing part 44.

In addition, the imaging apparatus 2 (electronic apparatus) of the present embodiment includes the opening and closing structure 6 described above.

According to such a configuration, the same effect as those of the opening and closing structure 6 can be obtained.

Other Embodiments

The embodiment has been described above as an example of the technology disclosed in the present application. However, the technology in the present disclosure is not limited thereto, and can also be applied to embodiments in which modifications, replacements, additions, omissions, etc., are appropriately made. Also, a new embodiment can be made by combining the respective constituent elements described in the above embodiment.

In the above embodiment, the press-fitting margin at the first press-fitting portion P1 is set to be larger than the press-fitting margin at the second press-fitting portion P2. However, not limited to such a case, the press-fitting margin at the second press-fitting portion P2 may be set to be larger than the press-fitting margin at the first press-fitting portion P1 by reversing the magnitude relationship.

If the press-fitting margin at the second press-fitting portion P2 is set to be larger than the press-fitting margin at the first press-fitting portion P1, the shaft member 38 does not rotate with the opening and closing lid 10 during the rotation of the opening and closing lid 10, and only the opening and closing lid 10 rotates relative to the shaft member 38.

Even in such a case, the opening and closing lid 10 rotates while generating friction between the shaft member 38 and the opening and closing lid 10 at the first press-fitting portion P1. As a result, the rotation speed of the opening and closing lid 10 can be reduced, and the impact at the contact portion X can be alleviated, similarly to the case where the press-fitting margin of the first press-fitting portion P1 is set to be larger than the press-fitting margin at the second press-fitting portion P2.

The embodiments have been described above as examples of the technology in the present disclosure.

For this purpose, the accompanying drawings and detailed description have been provided.

Therefore, the constituent elements described in the accompanying drawings and detailed description can include: not only constituent elements essential for solving the problems; but also those not essential for solving the problems in order to describe the technology as examples.

Therefore, those non-essential constituent elements should not be immediately recognized as being essential as they are described in the accompanying drawings and detailed description.

In addition, the above embodiments are to describe as example the technology in the present disclosure, and hence various changes, replacements, additions, omissions, etc. can be made within the scopes of the claims or their equivalents.

The present disclosure can be applied to an opening and closing structure for an insertion port in an electronic apparatus such as a digital camera or a PC, and to an electronic apparatus including the same.

What is claimed is:

1. An opening and closing structure for an insertion port comprising:
    an opening and closing lid that opens and closes an insertion port in an electronic apparatus;
    a shaft member that functions as a rotation axis of the opening and closing lid;
    a support member that rotatably supports the shaft member; and
    a biasing member that biases the opening and closing lid in an opening direction, wherein
    the shaft member is press-fitted into the opening and closing lid with a first press-fitting margin, and is press-fitted into the support member with a second press-fitting margin different from the first press-fitting margin.

2. The opening and closing structure for an insertion port according to claim 1, wherein the first press-fitting margin is larger than the second press-fitting margin.

3. The opening and closing structure for an insertion port according to claim 2, wherein a first bearing part where the support member receives the shaft member and a second bearing part where the opening and closing lid receives the shaft member are both made of resins, and the resin for the first bearing part has a higher hardness than a hardness of the resin for the second bearing part.

4. The opening and closing structure for an insertion port according to claim 1, wherein
    the opening and closing lid includes an inner lid and an outer lid that are rotatable integrally with the shaft member, and
    the shaft member is press-fitted into the inner lid, and is inserted into the outer lid in a non-press-fitted state.

5. The opening and closing structure for an insertion port according to claim 4, wherein the outer lid is slidable with respect to the inner lid between a lock position where rotation of the opening and closing lid is restricted and an unlock position where the restriction is released.

6. The opening and closing structure for an insertion port according to claim 1, wherein a bearing part, where the opening and closing lid receives the shaft member, has at least one rib.

7. The opening and closing structure for an insertion port according to claim 1, wherein the bearing parts, where the opening and closing lid receives the shaft member, are provided separately at two locations spaced apart from each other in an axial direction of the shaft member, and the shaft member is press-fitted into the bearing part on one side, while on another side, through the bearing part, the shaft member is inserted in a non-press-fitted state.

8. An electronic apparatus comprising the opening and closing structure according to claim 1.

* * * * *